United States Patent [19]

Grear

[11] 4,262,751

[45] Apr. 21, 1981

[54] TENSION FAILURE TRIP FOR SUBSOIL RIPPING SHANKS

[75] Inventor: Richard S. Grear, Carroll, Iowa

[73] Assignee: Royal Industries, Inc., Sac City, Iowa

[21] Appl. No.: 46,799

[22] Filed: Jun. 8, 1979

[51] Int. Cl.³ .................... A01B 13/08; A01B 61/04
[52] U.S. Cl. ................................... 172/271; 172/699
[58] Field of Search ......... 172/271, 699, 763, 261–270

[56] References Cited

U.S. PATENT DOCUMENTS

| 656,393 | 8/1900 | Davis | 172/271 |
|---|---|---|---|
| 1,207,146 | 12/1916 | Dickinson | 172/271 |
| 2,612,827 | 10/1952 | Baggette | 172/271 |
| 3,960,220 | 6/1976 | Laitala | 172/699 |
| 4,079,789 | 3/1978 | Byrd | 172/699 |

FOREIGN PATENT DOCUMENTS 1138538 7/1957 France.

OTHER PUBLICATIONS

Implement and Tractor, 8/7/1978, p. 51.

*Primary Examiner*—Richard J. Johnson

*Attorney, Agent, or Firm*—Wegner, Stellman, McCord, Wiles & Wood

[57] ABSTRACT

In an agricultural implement for use in ground breaking procedures including a frame adapted to be moved over the underlying terrain in a given direction, at least one ground breaking tool, a pivot connecting the tool to the frame for pivotal movement thereon about a generally horizontal axis generally transverse to the direction of movement between a forwarding ground breaking position and a rearward inoperative position and releasable means interconnecting the tool and the frame for normally holding the tool in the forward position and for releasing the tool for movement to the rearward position upon the tools encountering resistance sufficient to damage the implement. The invention contemplates the improvement wherein the releasable means is a replaceable, fracturable element interconnecting the frame and the tool at a location remote from the pivot and disposed in a plane generally transverse to the pivot axis so that resistance encountered by the tool will place the element in tension with little or no compression force imposed on the element. Upon fracture, the element is thereby stretched as opposed to being expanded and therefore is easily replaced.

2 Claims, 2 Drawing Figures

TENSION FAILURE TRIP FOR SUBSOIL RIPPING SHANKS

BACKGROUND OF THE INVENTION

This invention relates to agricultural implements, and more specifically, to agricultural implements used in ground breaking procedures such as subsoil ripping, plowing or the like.

Typically, tools such as plow blades or ripper shanks are secured to a frame which traverses the underlying terrain when pulled by a tractor or the like. The blades or shanks enter the underlying terrain and as the frame is moved thereover, perform the desired ground breaking operation.

During such movement, so long as only soil is encountered, no problem exists. However, not infrequently an obstacle such as a buried rock or the like of relatively large size is encountered by the tool which is impossible for the tool to dislodge. When such an obstacle is encountered, severe stresses are placed on the implement and may even be transmitted to the implement pulling vehicle. Such shocks can severely damage the equipment if no provision is made to avoid them.

Thus, it has been common to pivotally mount the tool on the frame for movement between a forward, ground breaking position and a rearward inoperative position whereat it may slip over the obstacle it has encountered. Releasable means are utilized to maintain the tool in its forwardmost position in normal operation and to release the tool for movement to its rearward position when some predetermined amount of resistance in excess of that normally encountered appears as, for example, when hitting an obstacle.

In general, the releasable means have taken on two different forms. In one form, a spring biased trip system is utilized. In another form, fracturable elements as shear pins have been utilized.

Spring trip linkages typically require considerably more components than shear pin type systems with a consequence that they are more expensive. The shear pin type system requires more effort to reengage after they have been tripped and require the replacement of the sheared pin.

Moreover, because a shear pin is typically disposed within two or more aligned bores on relatively movable components and sheared by a scissors-like action, the resulting deformation of the shear pin may make it extremely difficult to remove the remnants of the shear pin from the bore after shearing in order to replace it.

SUMMARY OF THE INVENTION

The principal object of the invention is to provide a new and improved agricultural implement of the type for use in ground breaking procedures. More specifically, it is an object of the invention to provide an agricultural implement of the type mentioned previously utilizing a pin-type trip, as opposed to a spring trip linkage, wherein the fracturable element may be easily replaced.

An exemplary embodiment of the invention achieves the foregoing object in an agricultural implement for ground breaking procedures including a frame adapted to be moved over the underlying terrain in a given direction. At least one ground breaking tool is provided and a pivot connects the tool to the frame for pivotal movement thereon about a generally horizontal axis generally transverse to the direction of movement and between a forward ground breaking position and a rearward inoperative position. Releasable means interconnect the tool and the frame for normally holding the tool in the forward position and for releasing the tool for movement to the rearward position upon the tools encountering resistance sufficient to damage the implement. The improvement of the invention resides in a releasable means which comprises a replaceable, fracturable element which is interconnected between the frame and the tool and which is subjected to a tension force, in major degree upon the tool encountering resistance. Because the fracturing force on the element is primarily tension, as opposed to shear or compression, the deformation of the element upon fracture is such that it can be easily removed and replaced.

In a highly preferred embodiment of the invention, the fracturable element is elongated and is in the form of a headed threaded bolt. The head of the bolt and a nut received on the bolt serve as means whereby the element is interconnected between the tool and the frame.

Other objects and advantages will become apparent from the following specifications taken in connection with the accompanying drawings.

DESCRIPTION OF THE PREFERRED EMBODIMENT

Figure 1:
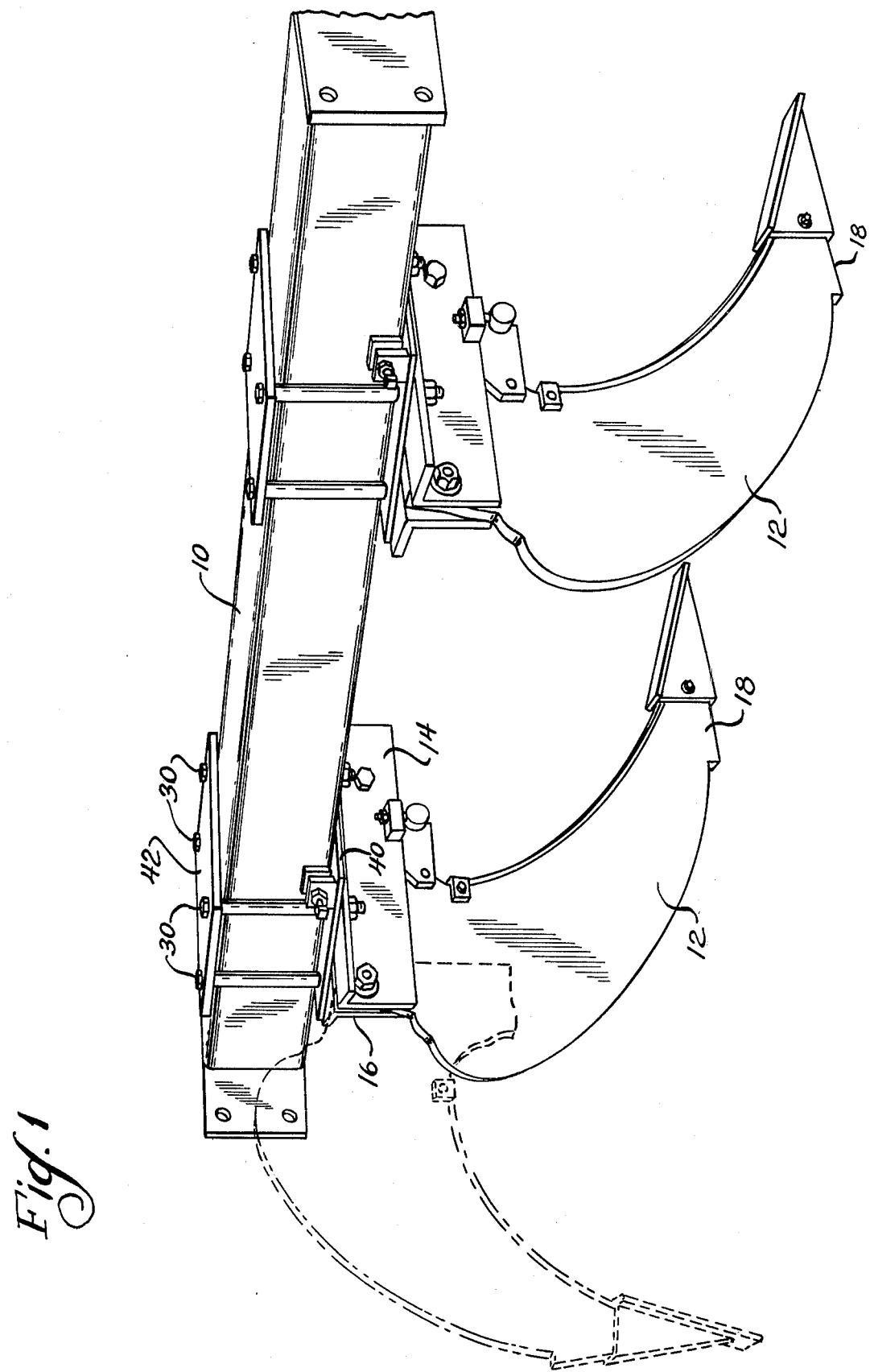
FIG. 1 is a perspective view of an implement made according to the invention.

An exemplary embodiment of an agricultural implement made according to the invention is illustrated in FIG. 1 in the form of a subsoil ripper. However, it is to be understood that the invention is not limited to such a use but may be advantageously employed wherever generally rigid, ground breaking tools are utilized.

The implement includes an elongated, tubular member 10 forming part of a frame. Other frame components are conventional and will not be described herein, it being understood that they are used as is customary. For example, typically wheels will be provided.

Depending from the tube 10 are one or more ripper shanks 12. Since the construction for each is identical, only one will be described.

As seen in FIG. 1, the ripper shank 12 is pivotally mounted to the frame 10 for movement between a first, forward position shown in solid lines in FIG. 1 wherein ground breaking operations are performed and a second, rearward position shown in dotted lines in FIG. 1. In the second position, the ripper shank 12 is inoperative and has been pivoted sufficiently rearwardly so as to easily pass over any obstacle it may have struck.

The ripper shank 12 is pivotally mounted to the tube 10 by a mounting structure including a pair of angle irons 14 and 16.

Figure 2:
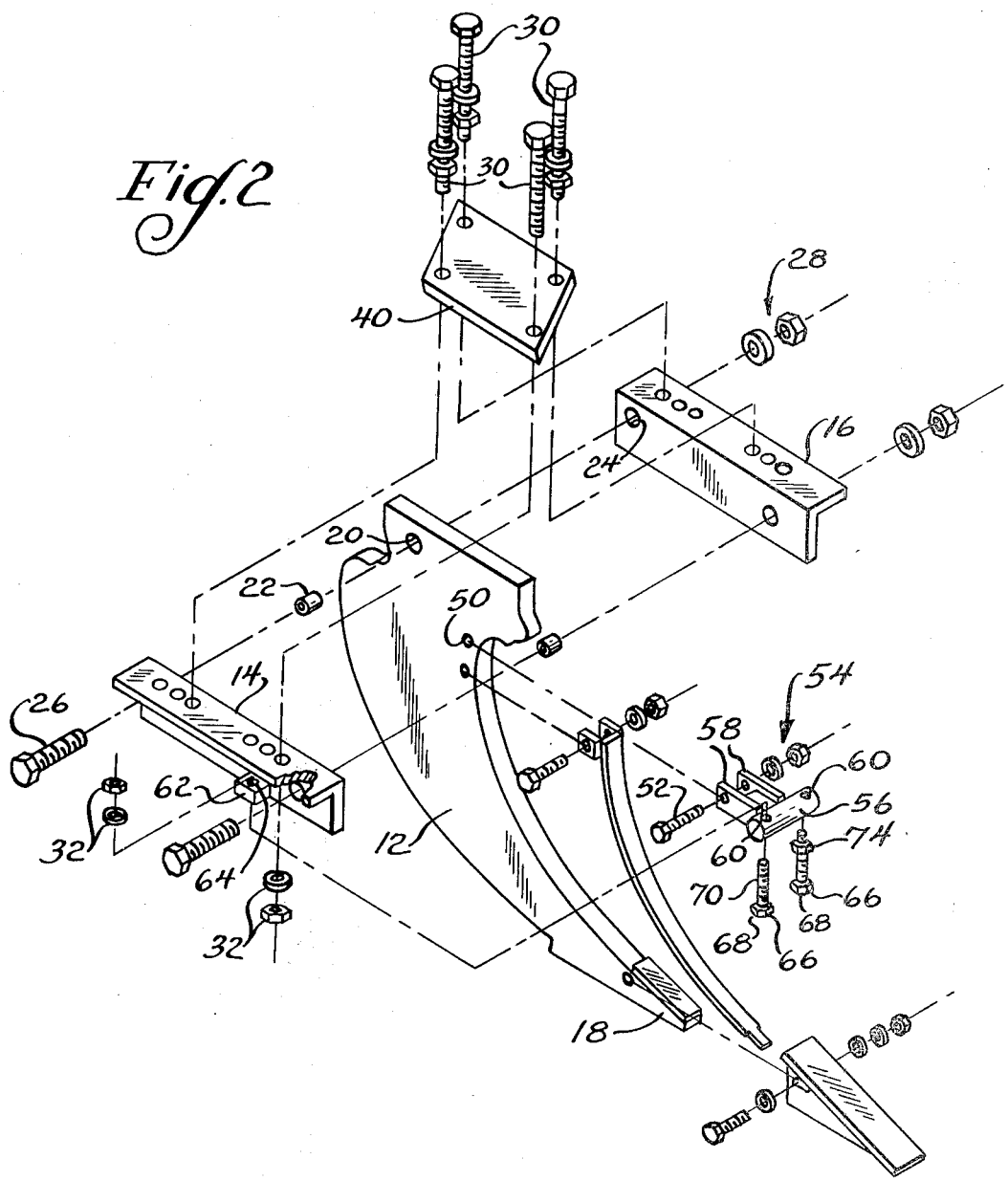
FIG. 2 is an exploded view of the components of a preferred embodiment.

As can be seen in FIG. 2, the upper end of the ripper shank 12 remote from its tip 18 is provided with a bore 20 which in turn receives a bushing 22. In the downwardly depending legs of the angle irons 14 and 16, and near the rear ends thereof, there are provided bores 24 (only one of which is shown) which are aligned and through which a bolt 26 extends to be held in place by a nut and lock washer combination 28. The bolt 26 also passes through the bushing 22 and thereby journals the ripper shank 12 between adjacent faces of the angle irons 14 and 16 for the above described movement.

The upper faces of the angle irons 14 and 16 are provided with a series of apertures as illustrated to cooperate with four bolts 30, two of the bolts 30 extending through aligned ones of apertures in each of the angle irons 14 and 16 to be captured by lock washers and nut combinations 32.

Suitably apertured plates 40 and 42 sandwich the tube 10 and also receive the bolts 30 to secure the angle irons 14 and 16 to the underside of the tube 10.

The various hardened metal components illustrated in FIGS. 1 and 2 are applied as illustrated in FIG. 2 to the forward end of each ripper shank 12 for the usual wear purposes. Immediately below the lower ends of the angle irons 14 and 16, and spaced from the pivot point defined by the bore 20, is an aperture 50. A bolt 52 extends through the aperture 50 to receive a lock washer and nut combination 54. The bolt 52 secures a cross member 56 to the forward edge of the ripper shank 12 via two rearwardly extending apertured tongues 58 which sandwich the blade 12 and receive the bolt 52.

As illustrated in FIG. 2, the cross member 56 is cylindrical but other configurations could be utilized if desired. In any event, opposite sides of the cross member 56 are provided with generally vertically directed apertures 60. As can be seen in FIG. 2, the apertures 60 are disposed on opposite sides of the blade 12 and spaced a distance greater than its width.

Each of the angle irons 14 and 16, forwardly of the pivot provided by the bolt 26, includes a horizontally directed tongue 62 having an aperture 64 therein. The apertures 64 are also generally vertically oriented and aligned with corresponding ones of the apertures 60 when the shank 12 is in its forwardmost position. In such a position, bolts 66 (FIG. 2) having heads 68 and threaded shanks 70 are loosely and not threadably, directed through corresponding ones of the apertures 60 and the apertures 64. The bolts 66 have lengths sufficient to extend above the upper surface of the tongues 62 and are held in place by nuts 74 threaded on the bolt and in abutment with the upper surface of the tongue 62.

Thus, the bolts 66 hold the shank 12 in its forwardmost position relative to the pivot.

It will be apparent from the drawings that the bolts 66 reside in planes which are transverse to the axis of rotation of the shank 12 on the frame. While the bolts 66 are shown as generally vertically disposed, as will become apparent hereinafter, this is not a necessity. However, it is necessary that the elongated axis of the bolts 66 not extend through the axis of rotation of the shank 12 relative to the frame and it is generally preferred to make the elongated axis of the bolts 66 to be fairly close to tangential to a circle having its center at the axis of rotation of the shank 12.

From the foregoing description of the invention, it will be appreciated that any unusual resistance applied to the shank 12 tending to move the same from the solid line position to the dotted line position illustrated in FIG. 1 will exert a stretching or tension force on the bolts 66. If this force becomes sufficiently great so that damage to the implement is eminent, the bolts 66 will elongate and ultimately fracture releasing the shank 12 to move to its rearwardmost position.

Because the bolts fracture under tension as opposed to shear or compression, as they elongate prior to fracture, they narrow so that the parts thereof remaining after fracture may be easily removed from the apertures 60 and 64 in which they are loosely received. In one embodiment, the bolts 66 are one-half inch bolts and the apertures 60 and 64 are nine-sixteenths inch bores. Thus, such bending of the bolts 66 as might occur will be insufficient to cause them to curl to the point where they cannot be removed.

To reset the implement for ground breaking operations, it is only necessary to pivot the shank 12 back to its forwardmost position and insert new bolts and fasten the same in place.

Thus, the invention provides for easy replacement of fracturable components thereby overcoming disadvantages of prior art structures which fracture pins or the like due to shear forces.

What is claimed is:

1. An agricultural implement for use in ground breaking procedures including a frame adapted to be moved over the underlying terrain in a given direction, at least one ground breaking tool, a pivot connecting the tool to the frame for pivotal movement thereon about a generally horizontal axis generally transverse to said direction between a forward ground breaking position and a rearward inoperative position and releasable means interconnecting said tool and said frame for normally holding said tool in said forward position and for releasing said tool for movement to said rearward position upon the tool's encountering resistance sufficient to damage said implement, said releasable means comprising a replaceable, fracturable, elongated element, and means connecting opposite ends of said element respectively to said frame and said tool for applying a tension force to said element in major degree upon said tool encountering resistance, said frame comprising a tube; a pair of angle irons abutting the under surface of said tube and extending generally in said direction of travel, said tool being pivoted between adjacent faces of said angle irons near one end thereof, a tongue on each of said angle irons forwardly of said pivot and being directed away from said tool, each tongue having an aperture, a cross member mounted on said tool and having spaced apertures alignable with corresponding ones of the apertures in said tongues when said tool is in said forward position, headed bolts extending through aligned ones of said apertures and a nut on each of said bolts, said bolts comprising said fracturable element.

2. The agricultural implement of claim 1 wherein said cross member is mounted on said tool by two rearwardly extending tongues sandwiching said tool to locate said cross member and said bolts at the forward edge of said tool.

* * * * *